Sept. 16, 1958  E. LONG ET AL  2,852,457
NUCLEAR REACTORS
Filed June 30, 1955  6 Sheets-Sheet 3

United States Patent Office 2,852,457
Patented Sept. 16, 1958

2,852,457

NUCLEAR REACTORS

Everett Long, Warrington, and James Wilfred Ashley, Appleton, England, assignors, by mesne assignments, to the United States of America as represented by the United States Atomic Energy Commission Application June 30, 1955, Serial No. 519,056

3 Claims. (Cl. 204—193.2)

This invention relates to nuclear reactors such as, for example, a reactor as disclosed in Patent No. 2,708,656, issued May 17, 1955 and it is concerned with graphite moderator structures therefor.

The primary function of a moderator structure is to moderate the energies of neutrons released during the fission process to thermal levels whereby a chain reaction can be maintained. In the course of this moderation process there is an inevitable loss of some neutrons. This loss may be regarded, in effect, as a loss or waste of fissile fuel and the cost of making good this waste is substantial. Design efforts are therefore directed to minimising neutron losses in and from the reactor core. Losses occur due to escape of neutrons from the core and by the absorption of the neutrons into the materials forming the core and the coolant in the core. In a conventional graphite moderator structure made as an assembly of graphite bricks spaced to allow for Wigner growth, that is, a growth attributable to the effects of radiation whilst in the reactor, unimpeded paths through the reactor core exist in the vertical and horizontal directions along which neutron streaming takes place with a consequent loss of neutrons.

The present invention sets out to reduce losses due to neutron streaming.

According to the invention, a graphite moderator structure for a nuclear reactor comprises an assembly of similarly orientated prismatic graphite blocks arranged on spaced longitudinal axes lying in common planes wherein the planes of the walls of the blocks are positioned so as to be twisted relative to the planes of said axes so that the unimpeded direct paths in direction wholly across the walls of the blocks are limited to the width of the blocks plus spacing between the blocks.

Otherwise described the structure claimed comprises a plurality of graphite blocks of square cross section arranged with their axes lying in two sets of parallel equidistant planes, the planes of one set being at right angles to the planes of the other set, the axis of each block lying in a plane of each set, two opposed surfaces of each block being slightly out of parallel with the planes of the said one set and being parallel with the corresponding opposed surfaces of each remaining block, the remaining two opposed surfaces of each block being slightly out of parallel with the planes of the said other set and parallel with the corresponding remaining opposed surfaces of each remaining block, said blocks being located close enough together that neutrons travelling in a direction normal to the axes of the blocks can travel no greater distance than the width of one block plus the distance between blocks before they strike a graphite block, whereby each interior block is directly surrounded by four blocks each having a surface adjacent and parallel to one surface of said interior block and extending laterally beyond said one surface.

A graphite structure embodying the invention is now described with reference to the accompanying drawings wherein.

Figure 1:
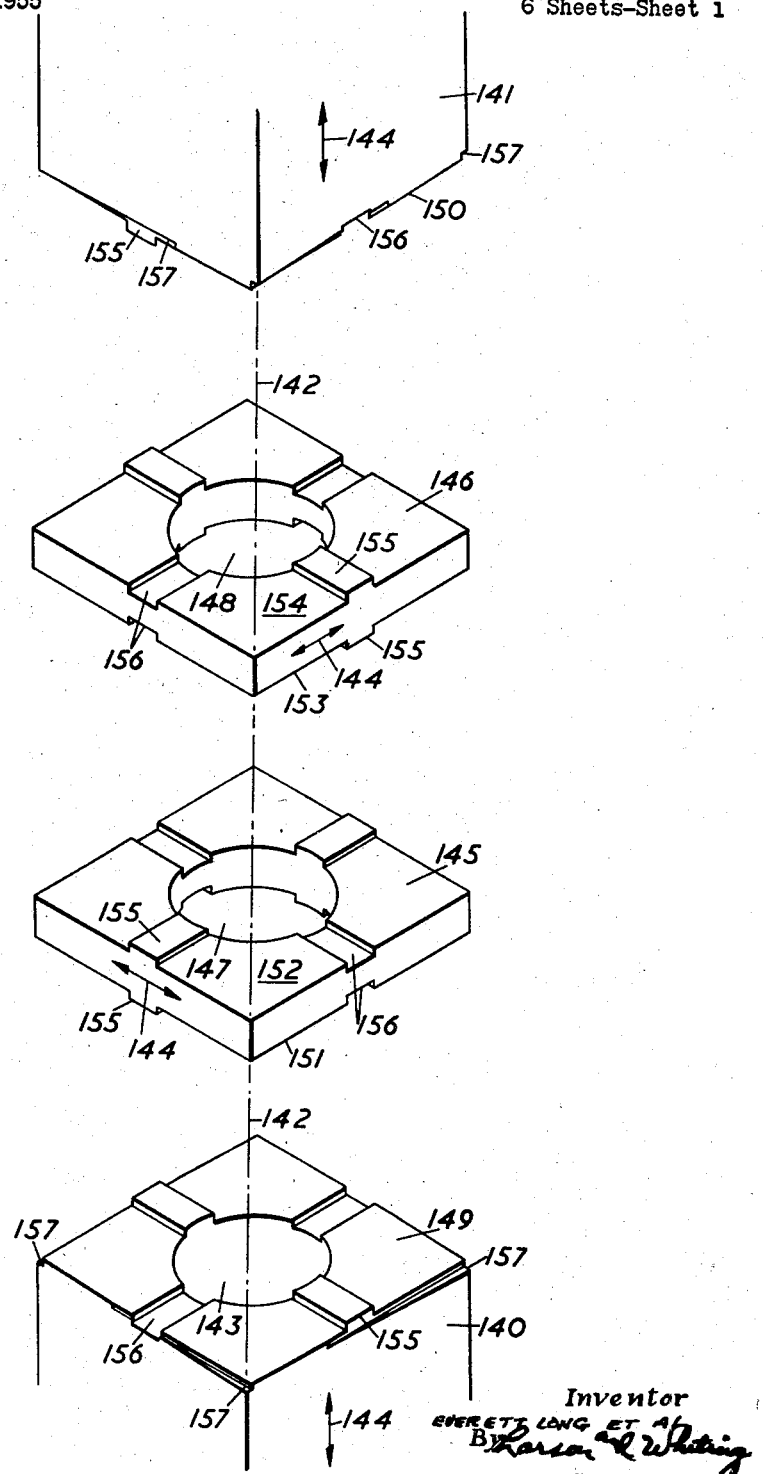
Fig. 1 is an exploded view of the ends of two graphite blocks in adjacent layers separated by two tiles.

Looking generally at Fig. 1 there is a right prismatic block 140 which is one of a lower layer of similar blocks and extending above it a right prismatic block 141, one of the next upper layer of similar blocks. The longitudinal axis of the blocks is indicated by the dotted line 142. In the complete graphite structure the axes 142 are arranged on a rectangular lattice.

Vertical axial coolant channels 143 are provided. The blocks 140 and 141 have minimum Wigner growth in the direction indicated by the arrows 144 (i. e. the direction of the grain in the graphite). A pair of tiles 145, 146, having central holes 147, 148 to line up with and of slightly larger size than the coolant channels 143, separate the adjacent end faces 149 of block 140 and 150 of block 141. The direction of minimum Wigner growth in the tiles is also indicated by the arrows 144 and it is seen that all the arrows 144 lie along one or other of three co-ordinate axes. The principal faces 151, 152, 153, 154 of the tiles are parallel with the faces 149 and 150. The faces 149, 150, 151, 152, 153 and 154 are provided with inter-locking keys 155 and keyways 156 which are parallel to the complementary co-ordinate axes as represented by the arrows 144 on the tiles.

The detail of Fig. 1 is as follows: the blocks 140, 141 are square in section, having a side dimension of 7.75 inches and a length of thirty inches. The keys and keyways 155, 156 in the blocks 140, 141, are at right angles to one another but twisted through 2°±2½″ relative to the sides of the blocks. Small cutaway portions 157 are provided, having an angle of 2°, on the end edges of the block. The dimension of the keys 155 on the blocks 140 and 141 are 0.994″ x 0.18″ and the dimension of the keyways 156 are 1.001″ x 0.241″ with a tolerance of .001″ on all dimensions. The dimensions of the tiles 145 and 146 are 8″ on the dimension of the arrows 144 and 7.75″ on the other dimension thereby providing a lattice pitch for fuel elements located in the channels 143 of 8″. The allowance for Wigner growth with the above dimensions is 0.25″. The side dimension of the blocks 140, 141 and the dimensions of the tiles which allow for Wigner growth vary throughout the graphite structure in a manner to be described later with reference to Fig. 4.

The rule to be usefully followed in the making of the tiles is that keys are made reaching to the side face of the tile which has minimum growth and the keyways are cut to the other side faces, i. e. keys are provided parallel to the 7.75″ dimension and keyways parallel to the 8″ dimension. This allows the structure to be assembled with conventional tolerances between keys and keyways which will loosen and not tighten during the life of the reactor. The two tiles 145, 146 are identical but they are assembled with a 90° twist relative to one another. The blocks 140, 141 are also identical but in assembly the blocks in one layer are upside down relative to the blocks in the adjacent layer.

Figure 2:
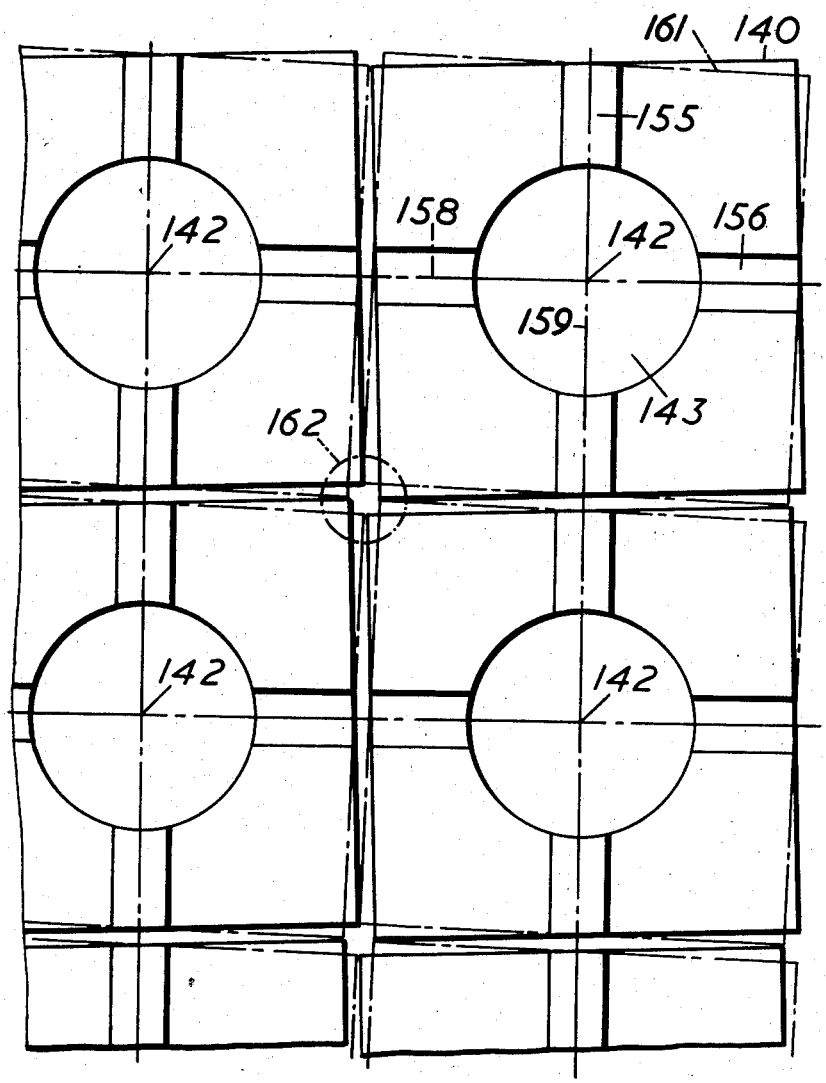
Fig. 2 is a plan view of four adjacent graphite blocks in a single layer.
Figure 2A:
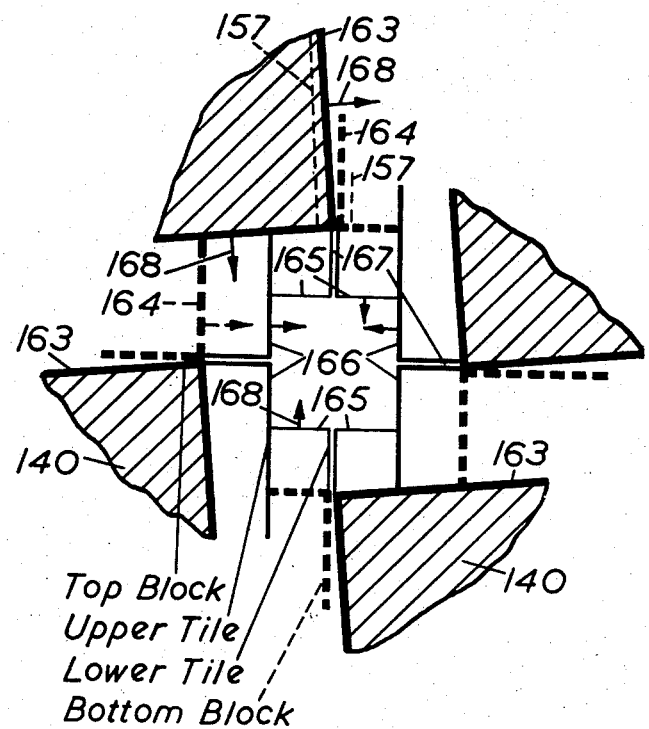
Fig. 2a is an enlarged view of a part of Fig. 2 showing the relative positions of tiles and blocks.

In Fig. 2 co-ordinate axes 158 and 159 are indicated by the chain dotted lines. The keys and keyways 155, 156 on the ends of blocks 140 are parallel to these axes but in view of the 2° twist referred to above the blocks take up a twisted position as shown. This twisted position ensures that the maximum length of direct path in the horizontal plane along which neutrons can stream before encountering graphite is 8" approximately. The overlap of the tiles relative to the blocks limits the direct vertical path to about thirty inches in all except small areas at the corners of the tiles. The position of the graphite blocks in the next lower layer is indicated by line 161 which corresponds also to the position of blocks 141 in the next higher layer. The coolant channel 143 is shown. An enlarged view of the area defined by the circle 162 is shown in Fig. 2a. Corners 163 of the blocks 140 are shown as heavy lines. Corners 164 of the blocks below are shown as dotted lines. Corners 165 are those of the adjacent tiles in one layer and corners 166 are those of adjacent tiles in the adjacent layer of tiles. The faces 167 are the butting side faces of the tiles. The direction of Wigner growth is indicated by arrows 168. It is seen that as the corners 163 and 164 move under Wigner growth conditions one edge of the corners passes over the butting side faces 167 of the tiles. In order to ensure an unimpeded expansion the cut away parts 157 (see also Fig. 1) are provided.

Vertical control rod holes are provided as required in a position indicated by the circle 162 (Fig. 2). The corners of blocks and tiles are cut away to provide for these holes, due allowance being made for Wigner growth so that the control rods have a free passage. The voidage of the whole graphite structure is about 3%.

Figure 3:
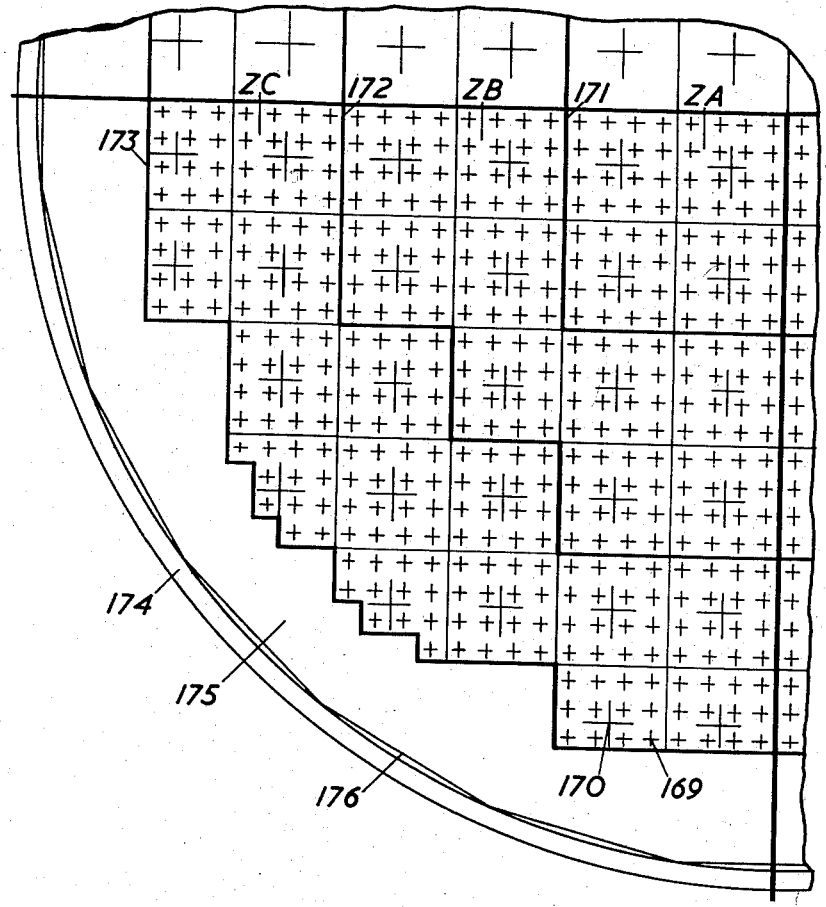
Fig. 3 is a quadrant plan view taken mid-way up the core of a vertically orientated graphite structure.

In Fig. 3 a symmetrical quadrant of a graphite structure is shown. The axes of the coolant channels are indicated by the crosses 169. The channels are grouped in sixteens (except at the periphery) and each group is provided with a control rod hole as indicated by the crosses 170. The graphite structure is divided into three transverse zones, called zones ZA, ZB and ZC the outer boundaries of which are indicated by the lines 171, 172 and 173 respectively. The quadrant ZA is shown as having sixty-four channels each of 4.16" diameter; ZB has one hundred and forty-four channels each of 3.95" diameter and ZC has two hundred and sixteen channels of 3.61" diameter. The control rod holes are 3.25" diameter. The spacing of the coolant channels is on a square lattice pitch of 8". The total number of fuel element channels in the whole structure is 1696. The change in channel diameter provides an approximate adjustment to allow for equal temperature rise of coolant passing through the channels.

The irregular outline of ZC is encased in solid graphite blocks without Wigner spacing which function as a reflector 175. The outline of the mass formed by the reflector blocks is a 24 side polygon 176 of 36' 0" diameter taken across the corners. This structure is supported in a pressure vessel 174.

Figure 4:
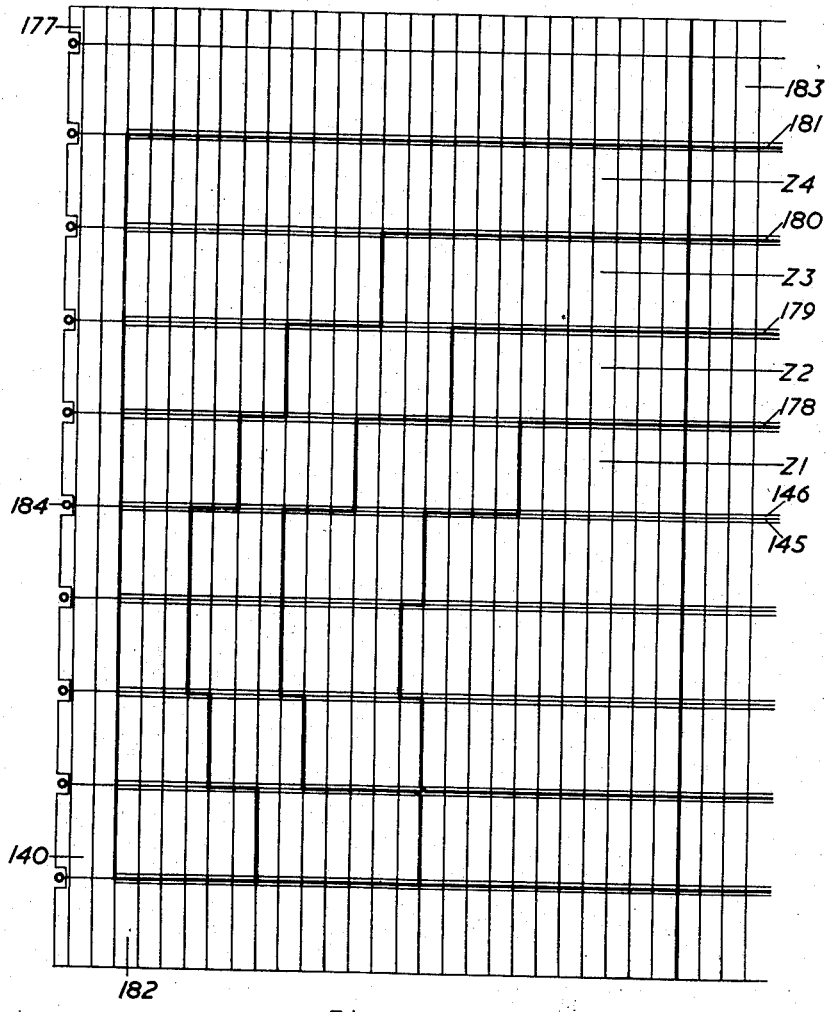
Fig. 4 is a half elevation taken along a centre line of the structure of Fig. 3.

In Fig. 4 the graphite structure is also shown consisting of ten layers of full length blocks 140 separated by two layers of tiles 145, 146 as described with reference to Figs. 1 and 2. A partial layer of blocks 177 is provided at the top. A bottom layer 182 of blocks serves as a base reflector and a top full layer 183 and the partial layer 177 serve as a top reflector. The structure is divided into zones called zones Z1, Z2, Z3 and Z4 the outer boundaries of which are indicated by the lines 178, 179, 180 and 181 respectively. These zones serve to define the Wigner tolerances on the blocks 140 and the tiles 145, 146. In Z1 the tolerance is 0.25" and in Z2 the tolerance is 0.18". Tolerances of 0.12" and 0.07" exist in Z3 and Z4 respectively. The zones represent an approximate measure of graphite growth in view of both neutron flux (Wigner growth) and temperature. The height of the graphite structure is 27 feet and it is designed for operation with inlet and outlet coolant temperatures of 140° C. and 350° C., respectively.

The physical stability of the graphite structure is achieved for the most part by the butting of faces of the tiles in conjunction with the cross keying provided by the keys and keyways. Tension bands 184 are provided around the 24-sided structure at each layer.

By having coolant channels which are bores in solid blocks leakage between channels and neutron streaming are kept down. The close fitting end faces to the graphite blocks and tiles only allow spaces along the very small clearances between the keys and keyways.

Figure 5:
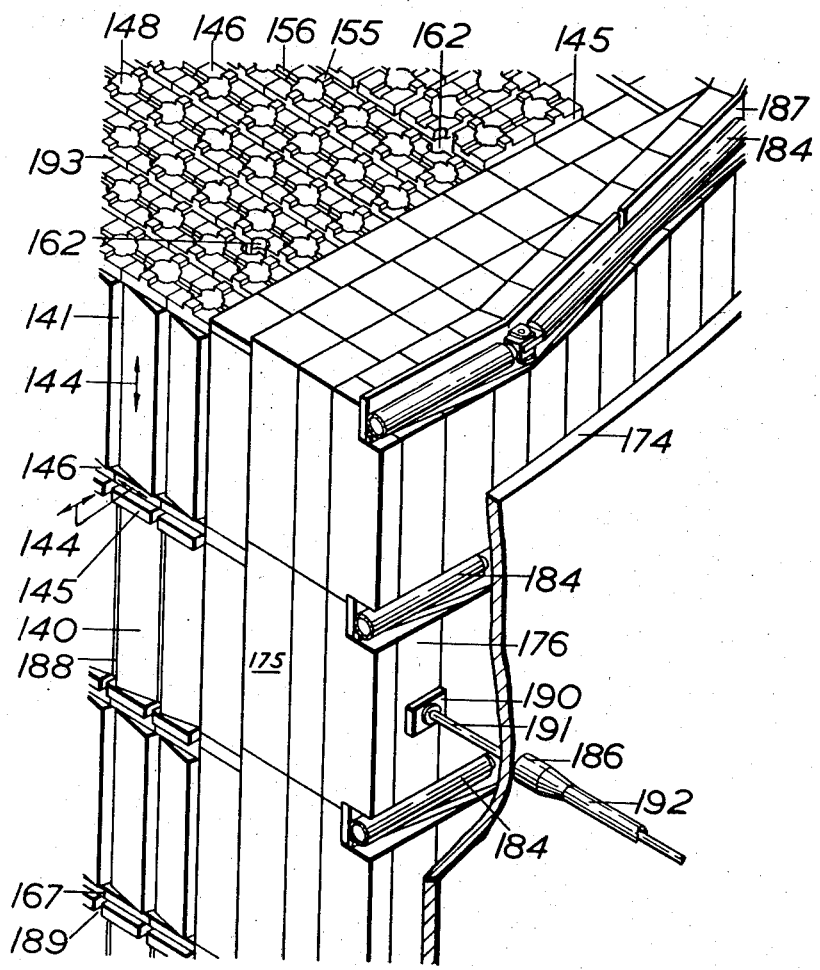
Fig. 5 is an isometric view of a part of a graphite structure.

Fig. 5 shows the pressure vessel 174 supporting a Wigner growth measuring probe 186. The probe comprises a foot 190 supported on a rod 191 movable in a tight fitting gland inside a sleeve 192 which is welded to the pressure vessel 174. The foot 190 rests against one of the walls 176 of the reflector structure 175. Tension bands 184 operating in conjunction with restraint plates 187 are shown. There are no spaces between the reflector graphite blocks and no requirement for tiles (like tiles 145, 146) as the Wigner growth in the reflector blocks is negligible.

The main graphite structure is shown as blocks 140, 141 separated by tiles 145, 146; the butting faces 167 being indicated. Arrows 144 show the direction of minimum Wigner growth and allowance for growth in the other axes is permitted by spaces 188, 189 and 193. The keys 155, keyways 156, fuel element and coolant channels 148 and control rod holes 162 are shown.

The arrangement of tiles between blocks with interfitting keys and keyways is the subject matter of copending application Serial No. 519,055.

We claim:

1. A structure for slowing neutrons to thermal energy comprising a plurality of graphite blocks of square cross section arranged with their axes lying in two sets of parallel equidistant planes, the planes of one set being at right angles to the planes of the other set, the axis of each block lying in a plane of each set, two opposed surfaces of each block being slightly out of parallel with the planes of the said one set and being parallel with the corresponding opposed surfaces of each remaining block, the remaining two opposed surfaces of each block being slightly out of parallel with the planes of the said other set and parallel with the corresponding remaining opposed surfaces of each remaining block, said blocks being located close enough together that neutrons travelling in a direction normal to the axes of the blocks can travel no greater distance than the width of one block plus the distance between blocks before they strike a graphite block, whereby each interior block is directly surrounded by four blocks each having a surface adjacent and parallel to one surface of said interior block and extending laterally beyond said one surface.

2. A structure according to claim 1 in which the blocks are vertically disposed and contain a coolant channel along the vertical axis thereof.

3. A structure according to claim 1 in which the amount the two opposed surfaces are out of parallel with the set of planes is about 2°.

References Cited in the file of this patent

UNITED STATES PATENTS

| | | |
|---|---|---|
| 2,708,656 | Fermi et al. | May 17, 1955 |
| 2,782,158 | Wheeler | Feb. 19, 1957 |
| 2,790,760 | Powell | Apr. 30, 1957 |

OTHER REFERENCES

Harwell: The British Atomic Energy Establishment (1946–1951). London, Her Majesty's Stationery Office, 1952, pp. 95–106.